(12) United States Patent
Twain

(10) Patent No.: US 6,425,348 B1
(45) Date of Patent: Jul. 30, 2002

(54) CHEWABLE PET SHELTER

(75) Inventor: Michael Twain, Portland, OR (US)

(73) Assignee: Choo Choo Imports, Portland, OR (US)

( * ) Notice: Subject to any disclaimer, the term of this patent is extended or adjusted under 35 U.S.C. 154(b) by 0 days.

(21) Appl. No.: 09/773,440

(22) Filed: Jan. 31, 2001

(51) Int. Cl.[7] .............................................. A01K 1/035
(52) U.S. Cl. ...................... 119/482; 119/709; 119/710; 119/711
(58) Field of Search ................................ 119/482, 709, 119/702, 710, 711; D30/108, 121, 160

(56) References Cited

U.S. PATENT DOCUMENTS

| | | | |
|---|---|---|---|
| 3,991,717 A | | 11/1976 | Buchanan |
| 4,270,756 A | * | 6/1981 | Ahlenfeld et al. ........... 473/513 |
| 4,419,372 A | * | 12/1983 | Greene et al. ............... 426/104 |
| 4,431,395 A | * | 2/1984 | Babos ......................... 249/133 |
| 4,681,758 A | * | 7/1987 | Fruthaler et al. ........... 424/410 |
| 4,880,642 A | * | 11/1989 | Berends ......................... 426/3 |
| D328,162 S | * | 7/1992 | Barreto et al. ............. D30/118 |
| 5,265,557 A | | 11/1993 | Lovitz |
| 5,476,069 A | * | 12/1995 | Axelrod ....................... 119/709 |
| 5,673,653 A | * | 10/1997 | Sherrill ........................ 119/709 |
| 5,950,568 A | | 9/1999 | Axelrod et al. |
| 6,277,420 B1 | * | 8/2001 | Andersen et al. ........... 426/138 |

FOREIGN PATENT DOCUMENTS

| | | | |
|---|---|---|---|
| WO | WO 97/05786 | * | 2/1997 |
| WO | WO/99/13707 | * | 3/1999 |

* cited by examiner

*Primary Examiner*—Yvonne R. Abbott
(74) *Attorney, Agent, or Firm*—Birdwell, Janke & Durando, PLC

(57) ABSTRACT

A chewable pet shelter. The shelter is used for a small animal and is formed of one or more panels of animal hide. The shelter has an open bottom circumference and the panels include at least one aperture for ingress and egress by the animal. The animal hide is preferably treated with a chemical flavoring that is appealing to the particular animal for which its use is intended.

19 Claims, 1 Drawing Sheet

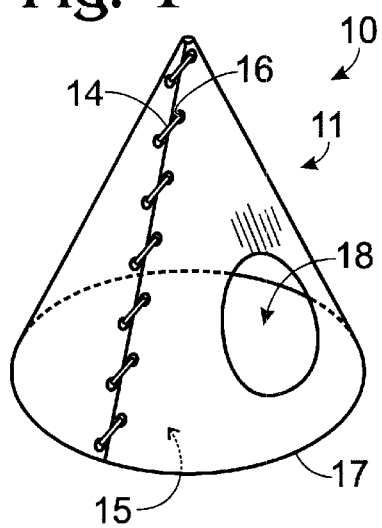
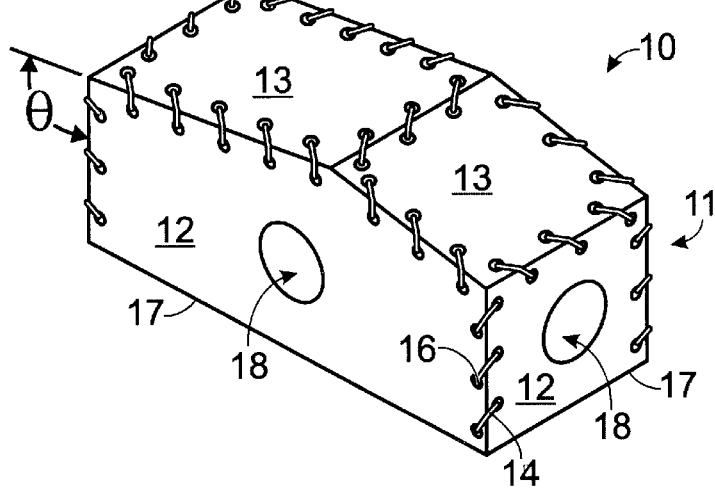
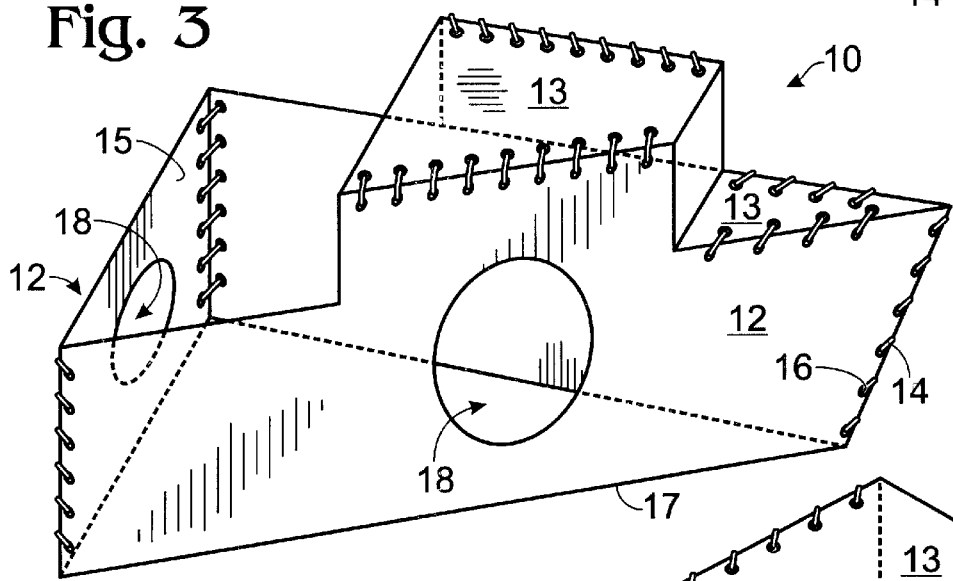
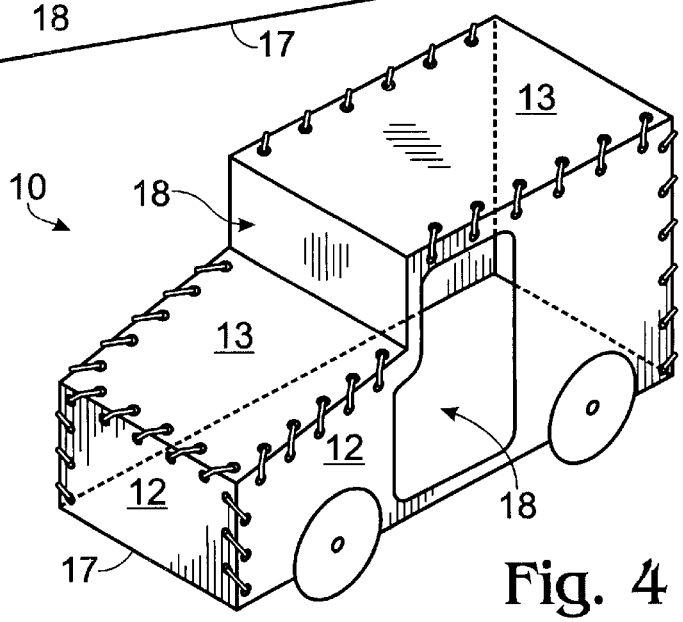

CHEWABLE PET SHELTER

BACKGROUND OF THE INVENTION

The present invention relates to a chewable pet shelter, particularly for use in sheltering small domestic animals such as gerbils and hamsters.

Pet shelters are provided for both indoor and outdoor use, typically for larger pets such as dogs. One problem with pet shelters is that the animal may destroy or damage the shelter, such as by chewing on it or soiling it. The prior art response to this problem has been to form the shelter of a material that is tough and easily cleaned, a preferred such material being plastic. However, it remains that many of the more durable materials used in shelters, such as plastic or wood, can have a harmful effect on the animal's digestive tract when ingested, and it is often not possible to prevent the animal from removing some of even the most durable materials by chewing. This is especially the case for rodents.

On the other hand, there are toys provided for the purpose of being chewed. Many of these are formed of rawhide and some are flavored to further encourage the animal to chew on the toy. The rawhide is tough, safe when ingested, adaptable for flavoring, and satisfying to the animal's instincts for chewing.

Accordingly, there is a need for a chewable pet shelter that encourages the animal to chew thereon and safely satisfies the animal's need for chewing while at the same time providing the function of a shelter.

SUMMARY OF THE INVENTION

The chewable pet shelter of the present invention solves the aforementioned problems and meets the aforementioned needs by providing an enclosure for a small domestic animal formed of one or more panels of animal hide. The shelter has an open bottom circumference and the panels include at least one aperture for ingress and egress by the animal. The hide is preferably treated with a chemical flavoring that is appealing to the particular animal for which its use is intended.

Therefore, it is a principal object of the present invention to provide a novel and improved chewable pet shelter.

It is another object of the present invention to provide a chewable pet shelter that provides for encouraging the animal to chew thereon.

It is still another object of the present invention to provide such a chewable pet shelter that provides for safely satisfying the animal's need for chewing thereby.

It is yet another object of the present invention to provide such a chewable pet shelter that provides for the above while at the same time providing the function of a shelter.

The foregoing and other objects, features and advantages of the present invention will be more readily understood upon consideration of the following detailed description of the invention, taken in conjunction with the following drawings.

BRIEF DESCRIPTION OF THE DRAWINGS

FIG. 1 is a pictorial view of a basic chewable pet shelter according to the present invention.

FIG. 2 is a pictorial view of a house style embodiment of a chewable pet shelter according to the present invention.

FIG. 3 is a pictorial view of a boat style embodiment of a chewable pet shelter according to the present invention.

FIG. 4 is a pictorial view of a truck style embodiment of a chewable pet shelter according to the present invention.

DETAILED DESCRIPTION OF A PREFERRED EMBODIMENT

Referring to FIG. 1, a basic chewable pet shelter 10 according to the present invention is shown. The shelter provides a substantially enclosed habitat for small domestic animals, preferably rodents such as hamsters, mice, gerbils and rats. The shelter has one or more panels 11 formed of animal hide, preferably rawhide. Mammals in particular seem to enjoy chewing on rawhide. Moreover, while rawhide is not the most durable of shelter materials, it is sufficiently resistant to being damaged by chewing to be a desirable shelter material. The panels 11 are joined preferably by stitching the panels together with a course weave rawhide lace 14 through eyelet apertures 16.

The panels 11 form an open bottom circumference 17 and include at least one aperture 18 for ingress and egress by the animal. The aperture 18 may have any shape, however its area is preferably at least about 1.75 square inches, such as by being formed as a circle having a diameter of about 1.5', to accommodate a large adult rat. A preferred interior volume, defined by interior surfaces 15 of the panels 11, is between about 30–60 cubic inches, which is generally sufficient to receive the small animal fully in the shelter. Preferably, a floor panel that could otherwise be attached to the open circumference 17 of the shelter is omitted to substantially prevent the animal from soiling the shelter which, because it is formed of rawhide, may be undesirably difficult to clean.

The shelter is preferably provided in fun configurations or forms, such as the simple teepee configuration shown in FIG. 1, or the more elaborate configurations depicted in FIGS. 2–5. In general, the panels 11 comprise both wall panels 12 and roof panels 13. For example, FIG. 2 shows a "house" style embodiment of the shelter 10 having four wall panels 12a–12d with a "gable" roof formed of two roof panels 13a and 13b that join the wall panels at an angle θ. Shown in FIG. 3 is a "boat" style embodiment of the shelter having three wall panels 12a–12c and two roof panels 13. FIG. 4 shows a "truck" style embodiment having four wall panels 12a–12d and two roof panels 13. Other shelter configurations may be provided as desired, and two or more shelters may be joined together to form a composite structure, wherein additional apertures 18 may be provided through the wall panels or roof panels of one or more of the shelters to permit the animal to move inside the composite structure from one of the shelters to another.

Because rawhide panels are flexible, the shelter is preferably provided in relatively small sizes for small animals, such as gerbils, hamsters and mice, rather than for large animals such as dogs, so that flexure of the panels is minimized and stiffness of the shelter is thereby maintained against its weight. Accordingly, the maximum length of the panels is preferably less than about 8 inches. In addition to limiting the overall size of the shelter, the panels 11 are preferably stiffened to increase structural integrity as a result of a processing described immediately below.

The panels 11 are preferably formed from the salted hides of buffalo or other cattle. In a preferred method of preparing the hides, the hides are soaked in an aqueous solution consisting essentially of about 3% sodium chloride and 4% lime powder by weight to remove hair. Next, the hides are split by removing fasica, meat, and fat, and splitting the hides into layers with a tannery fillet knife. The hides are then bleached with an aqueous solution consisting essentially of about 2.5% ammonium chloride, 1.5% hydrogen peroxide and 0.5% sulfuric acid by weight. Finally, the hides are stretched on frames and sun-dried after which they are typically stored for later use.

Hides used to form the laces 14 are further cut into thin strips and softened by soaking in an aqueous solution of about 0.7% hydrogen peroxide after which the lacing is thoroughly rinsed in clean water and left to soak therein to maintain maximum flexibility.

Hides used to form the panels 11 are cut to size and laced together, and the assembly is dried and decontaminated by being baked in an oven held between about 50–65 degrees centigrade for about 12 hours depending on the size, dimension and shape of the shelter.

After baking, chemical flavoring as is known in the art is preferably applied to the exterior of the shelter by spraying. As the shelter is particularly adapted for sheltering small animals such as gerbils, hamsters and mice, cheese flavoring is ideally provided in at least one of the panels 11 for such animals. The shelter with flavoring is then sent back to the oven at the temperatures indicated for about 2 hours.

As alternatives to cheese flavoring, it is contemplated that peanut, nacho cheese, brown sugar, ripe strawberry, strawberry, honey, orange, chocolate, apple, apricot, cantaloupe, grape, guava, mango, papaya, peach, pear, lemon, watermelon, banana and cherry flavorings may be employed. The flavorings may be obtained from Butterfield Food Ingredients Ltd. of Norfolk, England.

The shelter is preferably placed in the cage that is used as the habitat for the animal and provides a space in which the animal can feel safe. Moreover, the rawhide and flavoring are together responsible for encouraging the pet to chew on the shelter, which provides safe enjoyment for the pet while attracting the pet to remain in the shelter.

It is to be recognized that, while a particular chewable pet shelter has been shown and described as preferred, other configurations could be utilized, in addition to configurations already mentioned, without departing from the principles of the invention.

The terms and expressions which have been employed in the foregoing specification are used therein as terms of description and not of limitation, and there is no intention of the use of such terms and expressions of excluding equivalents of the features shown and described or portions thereof, it being recognized that the scope of the invention is defined and limited only by the claims which follow.

What is claimed is:

1. A chewable pet shelter for sheltering a domestic animal, comprising one or more panels of rawhide arranged so as to form a substantial enclosure having an open bottom circumference and an interior volume suitably sized to receive the animal, the shelter having at least one aperture through one or more of said panels suitably sized for entrance into and exit from said interior volume by the animal.

2. The shelter of claim 1, wherein two or more of said panels are stitched together with rawhide lace.

3. The shelter of claim 1, wherein the volume of the shelter is between about 30–60 cubic inches.

4. The shelter of claim 3, wherein the area of said at least one aperture is greater than or equal to about 1.75 square inches.

5. The shelter of claim 3, wherein a maximum length of said panels is about 8 inches.

6. The shelter of claim 1, wherein said panels include a flavoring added thereto.

7. The shelter of claim 6, wherein said flavoring includes cheese flavoring.

8. The shelter of claim 1, wherein said rawhide is stiffened by sun-drying and baking at temperatures equal to or above about 50 degrees centigrade for a predetermined period of time.

9. The shelter of claim 1, wherein said enclosure includes at least one wall panel forming a wall thereof and at least one panel forming a roof thereof, wherein said wall panel and said roof panel join one another at respective first edges of said panels at a substantially non-zero angle.

10. A chewable pet shelter for sheltering a domestic animal, comprising one or more panels of flavored rawhide arranged so as to form a substantial enclosure having a substantially open bottom circumference and an interior volume suitably sized to receive the animal, the shelter having at least one aperture through one or more of said panels suitably sized for entrance into and exit from said interior volume by the animal.

11. The shelter of claim 10, wherein two or more of said panels are stitched together with rawhide lace.

12. The shelter of claim 11, wherein the volume of the shelter is between about 30–60 cubic inches.

13. The shelter of claim 12, wherein a maximum length of said panels is about 8 inches.

14. The shelter of claim 13, wherein the total area of said at least one aperture is greater than or equal to about 1.75 square inches.

15. The shelter of claim 14, wherein said rawhide is stiffened by sun-drying and baking at temperatures equal to or above about 50 degrees centigrade for a predetermined period of time.

16. The shelter of claim 15, wherein said enclosure includes at least one wall panel forming a wall thereof and at least one panel forming a roof thereof, wherein said wall panel and said roof panel join one another at respective first edges of said panels at a substantially non-zero angle.

17. A method for sheltering a domestic animal, comprising providing one or more panels of rawhide, forming an enclosure with said panels, said enclosure having a substantially open bottom circumference and an interior volume suitably sized to receive the animal fully therein, providing at least one aperture through one or more of said panels, said aperture being suitably sized for entry into and exit from said interior volume by the animal, and placing the shelter in a cage normally used for habitation by the domestic animal.

18. The method of claim 17, wherein said domestic animal is from the group of rodents consisting of hamster, mouse, gerbil and rat.

19. The method of claim 17, further comprising sun-drying and baking said panels of rawhide to stiffen the panels.

* * * * *